US012787015B2

(12) United States Patent
Darwood et al.

(10) Patent No.: US 12,787,015 B2
(45) **Date of Patent: *Nov. 3, 2026**

(54) TELECOMMUNICATIONS METHOD AND SYSTEM

(71) Applicant: SCA IPLA HOLDINGS INC., New York, NY (US)

(72) Inventors: Peter Darwood, Bristol (GB); Darren Mcnamara, Clevedon (GB)

(73) Assignee: SCA IPLA HOLDINGS INC., New York, NY (US)

(*) Notice: Subject to any disclaimer, the term of this patent is extended or adjusted under 35 U.S.C. 154(b) by 516 days.

This patent is subject to a terminal disclaimer.

(21) Appl. No.: 18/064,331

(22) Filed: Dec. 12, 2022

(65) Prior Publication Data

US 2023/0109589 A1 Apr. 6, 2023

Related U.S. Application Data

(63) Continuation of application No. 16/592,774, filed on Oct. 4, 2019, now Pat. No. 11,528,691, which is a (Continued)

(30) Foreign Application Priority Data

Jun. 14, 2011 (GB) ..................................... 1109987

(51) Int. Cl.
*H04W 72/23* (2023.01)
*H04W 72/30* (2023.01)
*H04W 4/70* (2018.01)

(52) U.S. Cl.
CPC ........... *H04W 72/23* (2023.01); *H04W 72/30* (2023.01); *H04W 4/70* (2018.02)

(58) Field of Classification Search
CPC ........ H04W 72/23; H04W 72/30; H04W 4/70
See application file for complete search history.

(56) References Cited

U.S. PATENT DOCUMENTS 9,967,869 B2 5/2018 Darwood et al.
2007/0191019 A1 8/2007 Fischer et al.
(Continued)

FOREIGN PATENT DOCUMENTS

EP 2288045 A1 2/2011
WO 2010/053984 A2 5/2010

OTHER PUBLICATIONS

International Search Report issued Sep. 26, 2012 in PCT/GB2012/051327.

(Continued)

*Primary Examiner* — Un C Cho
*Assistant Examiner* — Alan L Lindenbaum
(74) *Attorney, Agent, or Firm* — XSENSUS LLP

(57) ABSTRACT

A mobile communications unit for communicating data to and/or from base stations, the unit being arranged to communicate data with one or more base stations via a wireless access interface provided by the one or more base stations; arranged to receive transmissions from the one or more base stations via at least one carrier, wherein carriers are logically separate sets of physical resources within a frequency range, the resources of a carrier providing a communication channel; and arranged, upon reception of allocation information comprising an indication of the location of common information within a first carrier, to access the common information in the first carrier, wherein the allocation information is provided in a second carrier and the common information is for at least one mobile unit using the first carrier and for at least one mobile unit using a second carrier.

14 Claims, 17 Drawing Sheets

Related U.S. Application Data continuation of application No. 15/947,025, filed on Apr. 6, 2018, now Pat. No. 10,462,779, which is a continuation of application No. 14/126,169, filed as application No. PCT/GB2012/051327 on Jun. 12, 2012, now Pat. No. 9,967,869.

(56) References Cited

U.S. PATENT DOCUMENTS

2007/0191020 A1 8/2007 Fischer et al.
2010/0034163 A1* 2/2010 Damnjanovic ....... H04L 5/0053 370/329
2010/0130218 A1* 5/2010 Zhang ................... H04W 48/12 455/458
2010/0246427 A1* 9/2010 Gheorghiu ............ H04W 72/04 370/252
2010/0273444 A1 10/2010 Wu
2010/0309867 A1 12/2010 Palanki et al.
2011/0034175 A1* 2/2011 Fong ..................... H04L 1/0077 455/450
2011/0080861 A1 4/2011 Fischer et al.
2011/0194510 A1 8/2011 Gaal et al.
2011/0243056 A1 10/2011 Jen
2011/0274066 A1 11/2011 Tee et al.
2012/0140760 A1 6/2012 Schmidt
2013/0058311 A1* 3/2013 Park ...................... H04W 92/10 370/329
2013/0258938 A1* 10/2013 Sagfors ................ H04W 72/02 370/312
2014/0029568 A1 1/2014 Wang et al.
2014/0112285 A1 4/2014 Darwood et al.

OTHER PUBLICATIONS

United Kingdom Search Report issued Oct. 7, 2011 in Patent Application No. GB1109986.8.
Korean Office Action issued in Korean Patent Application No. 10-2014-7001030 on Feb. 27, 2018.

* cited by examiner

TELECOMMUNICATIONS METHOD AND SYSTEM

CROSS-REFERENCE TO RELATED APPLICATIONS

This application is a continuation of U.S. application Ser. No. 16/592,774, filed Oct. 4, 2019, which is a continuation of U.S. application Ser. No. 15/947,025, filed Apr. 6, 2018 (now U.S. Pat. No. 10,462,779), which is a continuation of U.S. application Ser. No. 14/126,169, filed Jan. 7, 2014 (now U.S. Pat. No. 9,967,869), which is based on PCT filing PCT/GB2012/051327, filed Jun. 12, 2012, which claims the benefit of priority from prior British Application No. 1109987.6, filed Jun. 14, 2011, the entire contents of each of which are incorporated herein by reference.

TECHNICAL FIELD OF THE INVENTION

The present invention relates to methods, and mobile communications units for communicating data in a mobile communications system.

BACKGROUND OF THE INVENTION

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customers house and periodically transmit information back to a central MTC server data relating to the customers consumption of a utility such as gas, water, electricity and so on. Such MTC devices may therefore communicate using a different network to the conventional terminals where the networks can be more adapted to the needs of MTC devices or conventional terminals. As each of MTC devices and conventional devices then use a different autonomous network, some information may be duplicated in each network.

Also, systems where a terminal may be connected to more than one carrier are starting to emerge. For example a terminal may communicate with a base station via two separate carriers so that it can increase its throughput. The terminal then uses each of the two carriers in a manner similar to a single-carrier situation. Other terminals may be connected to only one of these two carriers and, in effect, these carriers are not exclusive to terminals using more than one carrier. Each of these carriers therefore has to be able to function autonomously from the other carriers. For example, the carrier has to provide the carrier control information and any carrier-management related information relevant to the terminals so that it is available to the terminals using this carrier only.

In situations where more than one carrier is provided, each of these carriers are usually expected to function autonomously from each other and they therefore comprise their own carrier-management information and any other broadcasted information or data so that a terminal connected to this carrier only can always be given access to the information or data in the carrier. In some situations, in order to ensure that each of these carriers may be autonomously used by a terminal, there may be partial or complete duplication of such data in two or more carriers.

SUMMARY OF THE INVENTION

Various aspects and features of the present invention are defined in the appended claims.

In the example of MTC devices, whilst it can be convenient for a terminal such as an MTC type terminal to take advantage of the wide coverage area provided by a third or fourth generation mobile telecommunication network there are at present disadvantages. Unlike a conventional third or fourth generation mobile terminal such as a smartphone, an MTC-type terminal is preferably relatively simple and inexpensive. The type of functions performed by the MTC-type terminal (e.g. collecting and reporting back data) do not require particularly complex processing to perform. However, third and fourth generation mobile telecommunication networks typically employ advanced data modulation techniques on the radio interface which can require more complex and expensive radio transceivers to implement. It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. There can therefore be provided carriers for devices having limited capabilities, where these carriers (sometimes called "virtual carriers") are provided within a larger carrier (sometimes called "host carrier"). In that respect, the reader is directed to our co-pending UK patent applications numbers: 1101970.0, 1101981.7, 1101966.8, 1101983.3, 1101853.8, 1101982.5, 1101980.9 and 1101972.6, the contents of which are incorporated herein by reference. The virtual carrier may for example be used mainly by MTC type devices while the host carrier may be mainly used by conventional terminals. The host and virtual carriers may for example be provided in an independent manner. In such an example, the terminals connected to the host carrier are not aware or directly affected by an eventual virtual carrier within the host carrier, while terminals connected to the virtual carrier are unaware of the host carrier configuration, or data. In effect, even though the virtual carrier is provided within a host carrier, these two carriers are logically separate and each carrier is an autonomous carrier. For example, they may each comprise their own control information and any carrier-management related information relevant to their respective terminals.

According to an aspect of the invention, there is provided a mobile communications unit for communicating data to and/or from base stations, the mobile communications unit being arranged to communicate data with one or more base stations via a wireless access interface provided by the one or more base stations and to receive transmissions from the one or more base stations via at least one carrier. The carriers are logically separate sets of physical resources within a frequency range and the resources of a carrier provide a communications channel. The mobile communications unit is further arranged, upon receipt of allocation information comprising an indication of the location of common information within a first carrier, to access the common information in the first carrier. The allocation information is provided in a second carrier and the common information is for at least one mobile unit using the first carrier and for at least one mobile unit using a second carrier.

There has therefore been provided a mobile communications unit that can access common information where allocation information is provided in two different and logically separate carriers, wherein the allocation information in each of the carriers comprises an indication of the location of the common information in one of the carriers. As a result, the mobile communications unit enables a reduction in the amount of resources allocated to transmit the information by sending information common to two or more carriers in one carrier. Thus, by providing such a mobile communications unit, the total throughput available via the carriers for other information has been increased.

According to another aspect of the invention, there is provided a method of operating a mobile communications unit which is arranged to communicate data with one or more base stations via a wireless access interface provided by the one or more base stations. The method comprises receiving transmissions from the one or more base stations via at least one carrier, wherein the at least one carrier are logically separate sets of physical resources within a frequency range, the resources of a carrier providing a communication channel. The method further includes upon receipt of allocation information comprising an indication of the location of common information within a first carrier, accessing the common information in the first carrier. The allocation information is provided in a second carrier and the common information is for at least one mobile unit using the first carrier and for at least one mobile unit using a second carrier.

Various further aspects and embodiments of the invention are provided in the appended claims, including but not limited to, a mobile communications unit for communicating data to and/or from base stations and a method of operating a mobile communications unit.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

The example embodiments will be generally described in the context of a 3GPP LTE architecture. However, the invention is not limited to an implementation in a 3GPP LTE architecture. Conversely, any suitable mobile architecture is considered to be relevant.

Conventional Network

Figure 1:
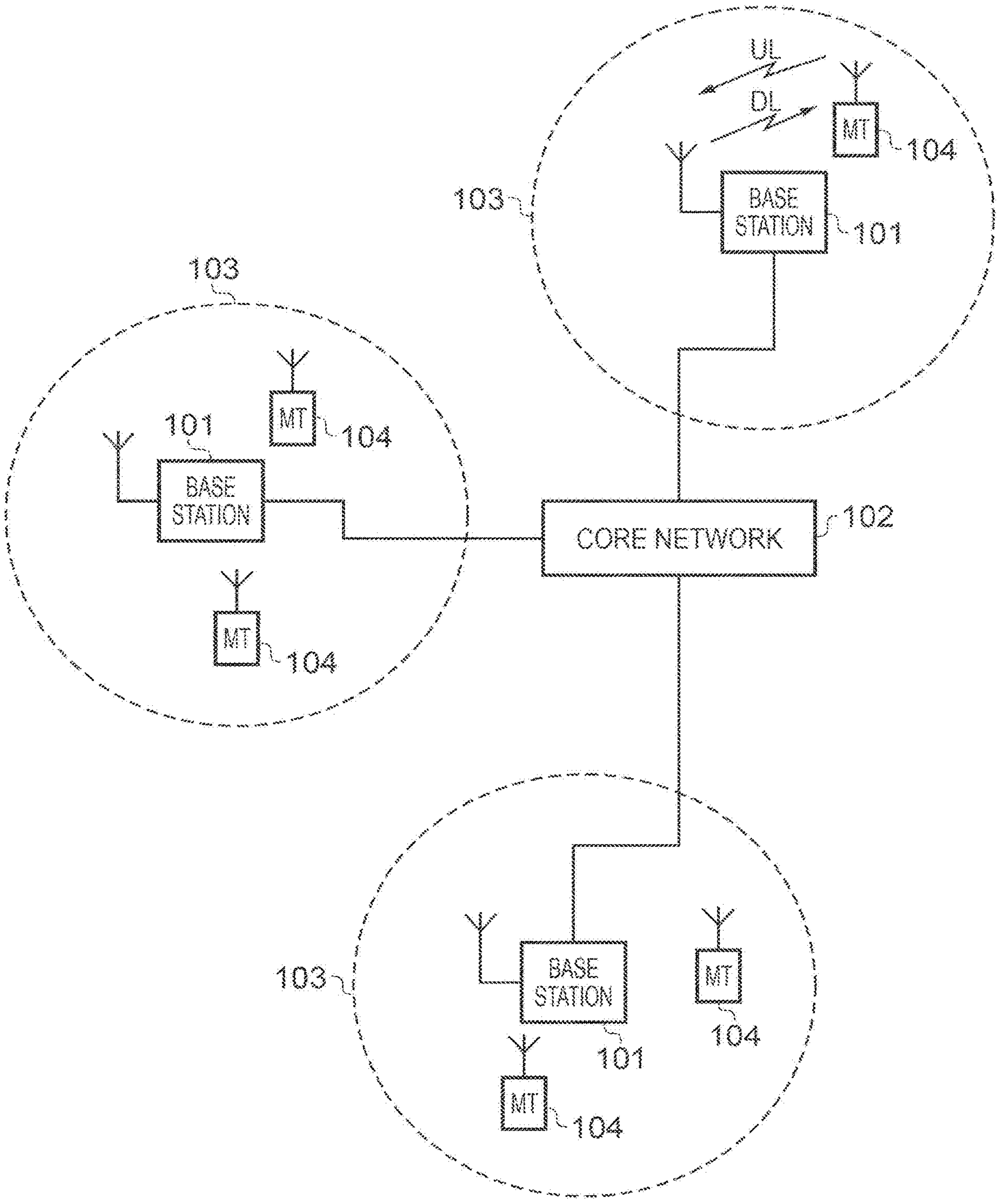
Prior Art FIG. 1
FIG. 1 provides a schematic diagram illustrating an example of a conventional mobile telecommunication network.

FIG. 1 provides a schematic diagram illustrating the basic functionality of a conventional mobile telecommunications network.

The network includes a plurality of base stations 101 connected to a core network 102. Each base station provides a coverage area 103 (i.e. a cell) within which data can be communicated to and from mobile terminals 104. Data is transmitted from a base station 101 to a mobile terminal 104 within a coverage area 103 via a radio downlink. Data is transmitted from a mobile terminal 104 to a base station 101 via a radio uplink. The core network 102 routes data to and from the mobile terminals 104 and provides functions such as authentication, mobility management, charging and so on.

Figure 2:
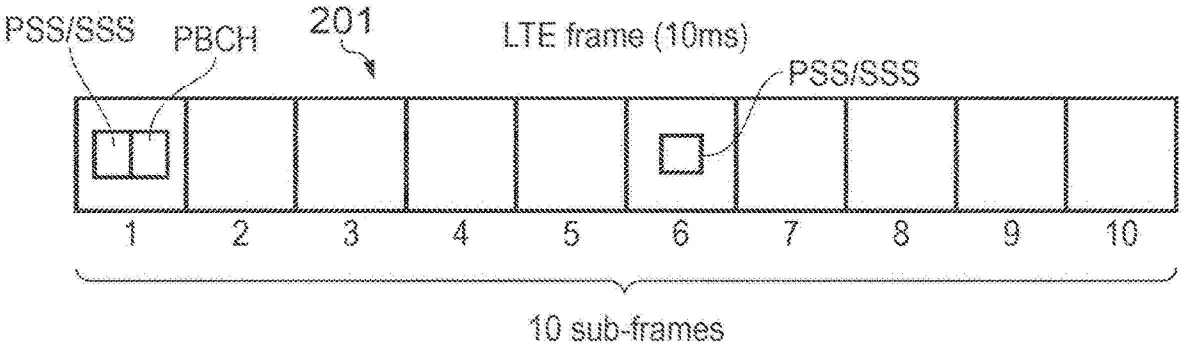
Prior Art FIG. 2
FIG. 2 provides a schematic diagram illustrating a conventional LTE downlink radio frame.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA). Data is transmitted on the uplink and on the downlink on a plurality of orthogonal sub-carriers. FIG. 2 shows a schematic diagram illustrating an LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE frame. A primary broadcast channel (PBCH) is transmitted in the first sub-frame of the LTE frame. The PSS, SSS and PBCH are discussed in more detail below.

Figure 3:
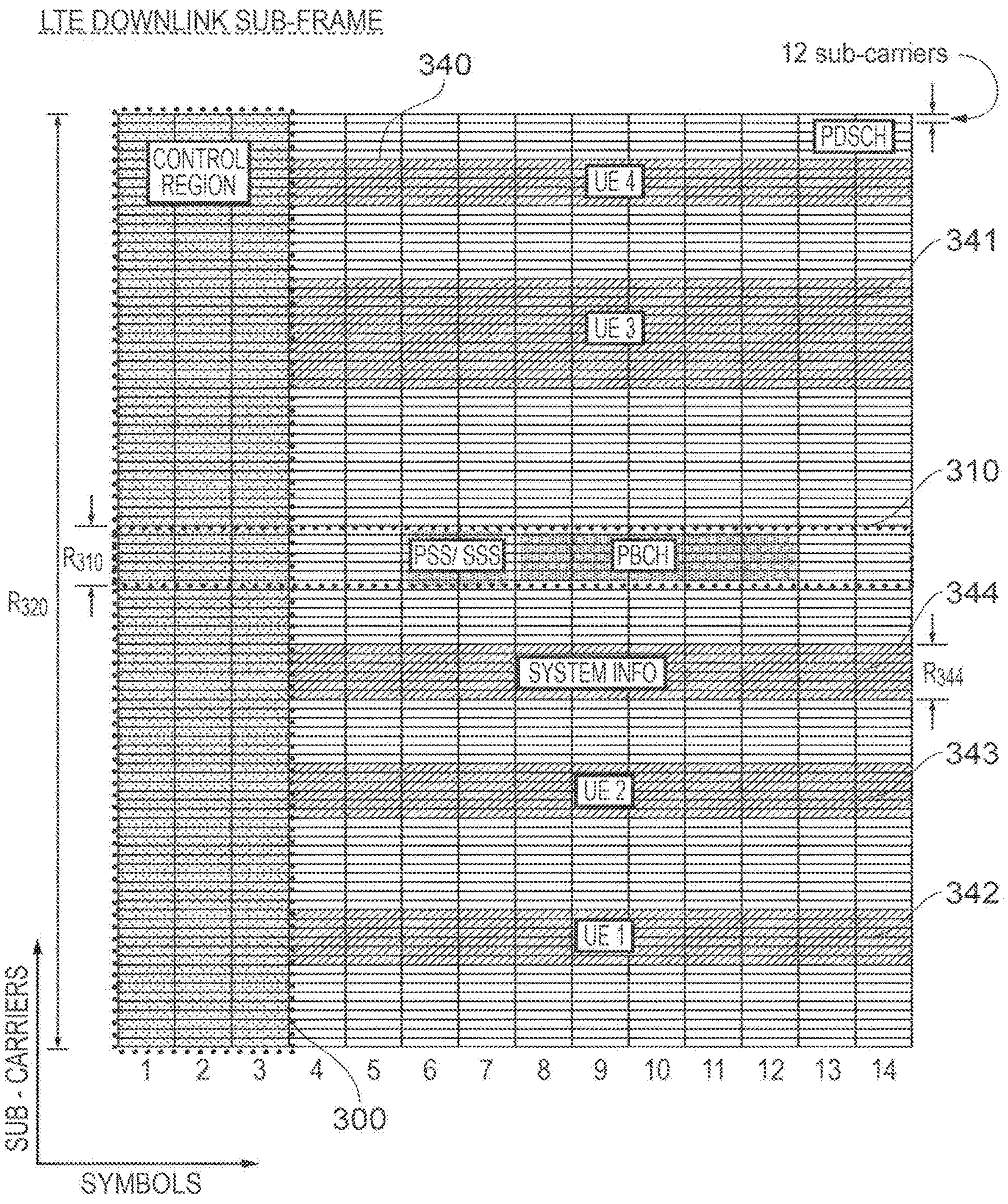
Prior Art FIG. 3
FIG. 3 provides a schematic diagram illustrating a conventional LTE downlink radio sub-frame.

FIG. 3 provides a schematic diagram providing a grid which illustrates the structure of an example of a conventional downlink LTE sub-frame. The sub-frame comprises a predetermined number of symbols which are transmitted over a 1 ms period. Each symbol comprises a predetermined number of orthogonal sub-carriers distributed across the bandwidth of the downlink radio carrier.

The example sub-frame shown in FIG. 3 comprises 14 symbols and 1200 sub-carriers spaced across a 20 MHz bandwidth. The smallest unit on which data can be transmitted in LTE is twelve sub-carriers transmitted over one sub-frame. For clarity, in FIG. 3, each individual resource element is not shown, instead each individual box in the sub-frame grid corresponds to twelve sub-carriers transmitted on one symbol.

FIG. 3 shows resource allocations for four LTE terminals 340, 341, 342, 343. For example, the resource allocation 342 for a first LTE terminal (UE 1) extends over five blocks of twelve sub-carriers, the resource allocation 343 for a second LTE terminal (UE2) extends over six blocks of twelve sub-carriers and so on.

Control channel data is transmitted in a control region 300 of the sub-frame comprising the first n symbols of the sub-frame where n can vary between one and three symbols for channel bandwidths of 3 MHz or greater and where n can vary between two and four symbols for channel bandwidths of 1.4 MHz. For clarity, the following description relates to host carriers with channel bandwidth of 3 MHz or greater where the maximum value of n will be 3. The data transmitted in the control region 300 includes data transmitted on the physical downlink control channel (PDCCH), the physical control format indicator channel (PCFICH) and the physical HARQ indicator channel (PHICH).

The PDCCH contains control data indicating which sub-carriers on which symbols of the sub-frame have been allocated to specific LTE terminals. Thus, the PDCCH data transmitted in the control region 300 of the sub-frame shown in FIG. 3 would indicate that UE1 has been allocated the first block of resources 342, that UE2 has been allocated the second block of resources 343, and so on. The PCFICH contains control data indicating the size of the control region (i.e. between one and three symbols) and the PHICH contains HARQ (Hybrid Automatic Request) data indicating whether or not previously transmitted uplink data has been successfully received by the network.

In certain sub-frames, symbols in a central band 310 of the sub-frame are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow the LTE terminal 104 to achieve frame synchronisation and determine the cell identity of the enhanced Node B transmitting the downlink signal. The PBCH carries information about the cell, comprising a master information block (MIB) that includes parameters that the LTE terminals require to access the cell. Data transmitted to individual LTE terminals on the physical downlink shared channel (PDSCH) can be transmitted in the remaining blocks of resource elements of the sub-frame. Further explanation of these channels is provided in the following sections.

FIG. 3 also shows a region of PDSCH containing system information and extending over a bandwidth of $R_{344}$.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth as shown in FIG. 3. As is known in the art, data transmitted on the PDCCH, PCFICH and PHICH is typically distributed on the sub-carriers across the entire bandwidth of the sub-frame. Therefore a conventional LTE terminal must be able to receive the entire channel bandwidth in order to receive and decode the control region.

Figure 4:
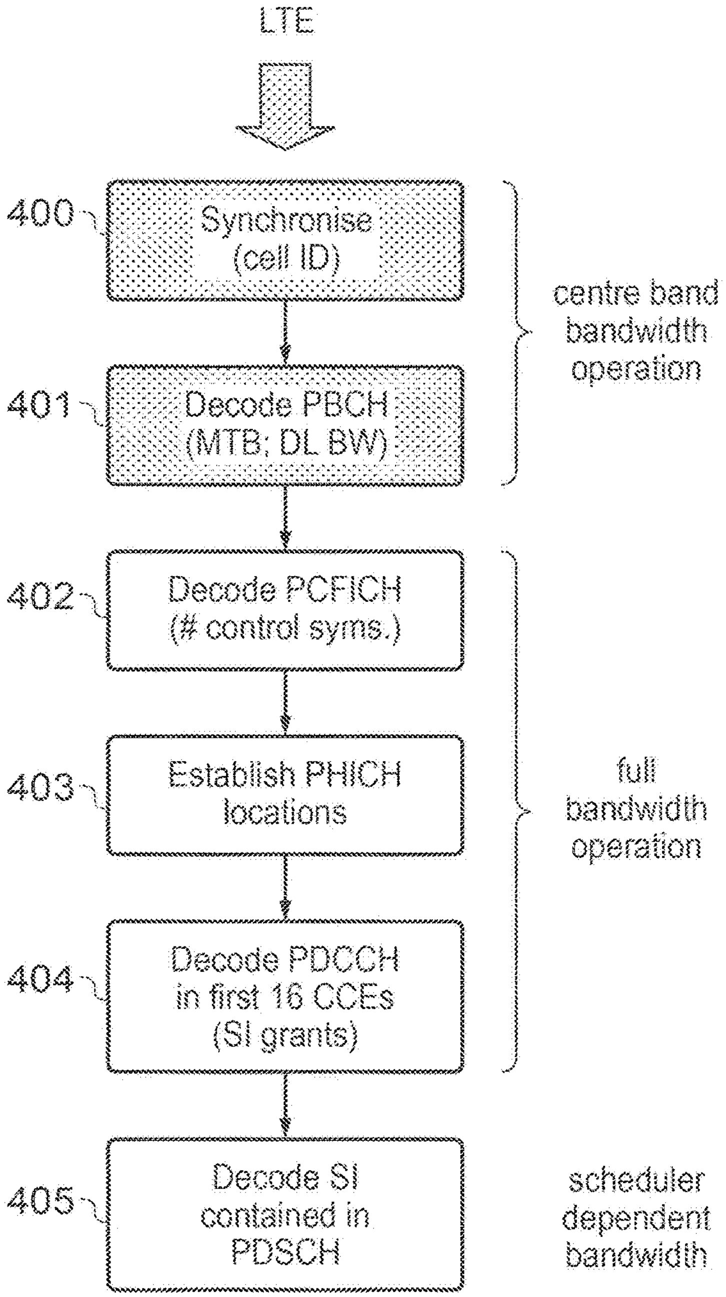
Prior Art FIG. 4
FIG. 4 provides a schematic diagram illustrating a conventional LTE "camp-on" procedure.

FIG. 4 illustrates an LTE "camp-on" process, that is, the process followed by a terminal so that it can decode downlink transmissions which are sent by a base station via a downlink channel. Using this process, the terminal can identify the parts of the transmissions that include system information for the cell and thus decode configuration information for the cell.

As can be seen in FIG. 4, in a conventional LTE camp-on procedure, the terminal first synchronizes with the base station (step 400) using the PSS and SSS in the centre band and then decodes the PBCH (step 401). Once the terminal has performed steps 400 and 401, it is synchronized with the base station.

For each sub-frame, the terminal then decodes the PCFICH which is distributed across the entire width of carrier 320 (step 402). As discussed above, an LTE downlink carrier can be up to 20 MHz wide (1200 sub-carriers) and an LTE terminal therefore has to have the capability to receive and decode transmissions on a 20 MHz bandwidth in order to decode the PCFICH. At that stage, with a 20 MHz carrier band, the terminal operates at a much larger bandwidth (bandwidth of $R_{320}$) than during steps 400 and 401 (bandwidth of $R_{310}$) relating to synchronization and PBCH decoding.

The terminal then ascertains the PHICH locations (step 403) and decodes the PDCCH (step 404), in particular for identifying system information transmissions and for identifying its personal allocation grants. The allocation grants are used by the terminal to locate system information and to locate its data in the PDSCH. Both system information and personal allocations are transmitted on PDSCH and scheduled within the carrier band 320. Steps 403 and 404 also require the terminal to operate on the entire bandwidth R320 of the carrier band.

At steps 402 to 404, the terminal decodes information contained in the control region 300 of a sub-frame. As explained above, in LTE, the three control channels mentioned above (PCFICH, PHICH and PDCCH) can be found across the control region 300 of the carrier where the control region extends over the range $R_{320}$ and occupies the first one, two or three OFDM symbols of each sub-frame as discussed above. In a sub-frame, typically the control channels do not use all the resource elements within the control region 300, but they are scattered across the entire region, such that a LTE terminal has to be able to simultaneously receive the entire control region 300 for decoding each of the three control channels.

The terminal can then decode the PDSCH (step 405) which contains system information or data transmitted for this terminal.

When one or more base stations provide several carriers for transmitting information to mobile units, there may sometimes be an overlap in data transmitted in each of the carriers. If for example a base station sends system information in two or more carriers provided by this base station, the system information may comprise information common to the two carriers and there may therefore be duplication in the system information transmitted in the two carriers. This duplication may be considered as a less than optimal use of resources and a reduction of this duplication may therefore be desirable.

The following two examples illustrate how this duplication may be reduced in two example situations. In the first situation two carriers are provided, one carrier being provided within the other carrier, and in the second situation two carriers are provided and have non-overlapping frequency ranges. However the invention is not limited to these two specific examples. It is in particular intended that at least any situation with two or more carriers provided by one or more base stations, where there may be duplication in data transmitted to one or more mobile units in the first and second carriers, be considered as a suitable situation for an embodiment.

Virtual Downlink Carrier Example

Certain classes of devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional LTE terminals. In many scenarios, providing low capability terminals such as those with a conventional high-performance LTE receiver unit capable of receiving and processing data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit which is more proportionate with the amount of data likely to be transmitted to the terminal. This has therefore led to the emergence of a concept sometimes called “virtual carrier”, where the “virtual carrier” is inserted in a conventional downlink carrier (i.e. a “host carrier”). Unlike data transmitted on a conventional downlink carrier, data transmitted on the virtual carrier can be received and decoded without needing to process the full bandwidth of the downlink host carrier. Accordingly, data transmitted on the virtual carrier can be received and decoded using a reduced complexity receiver unit. For the sake of completeness, possible examples of a virtual carrier will be briefly explained. However, more details can be found from the co-pending UK applications identified above.

Figure 5:
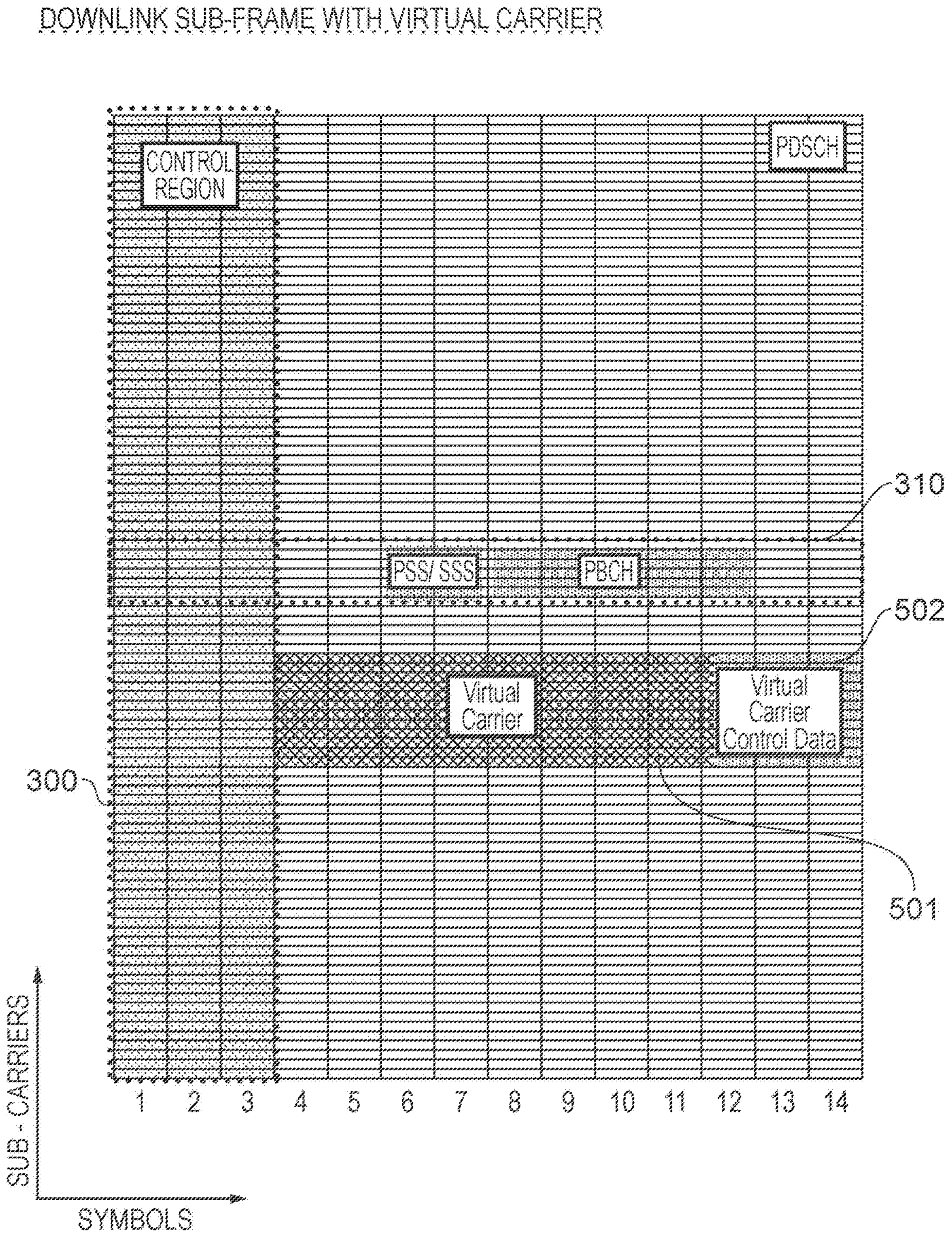
FIG. 5 provides a schematic diagram illustrating an LTE downlink radio sub-frame in which a virtual carrier has been inserted.

FIG. 5 provides a schematic diagram illustrating an LTE downlink sub-frame which includes a virtual carrier inserted in a host carrier in accordance with an example of the present invention.

In keeping with a conventional LTE downlink sub-frame, the first n symbols (n is three in FIG. 5) form the control region 300 which is reserved for the transmission of downlink control data such as data transmitted on the PDCCH. However, as can be seen from FIG. 5, outside of the control region 300 the LTE downlink sub-frame includes a group of resource elements below the central band 310 which form a virtual carrier 501. As will become clear, the virtual carrier 501 is adapted so that data transmitted on the virtual carrier 501 can be treated as logically distinct from the data transmitted in the remaining parts of the host carrier and can be decoded without first decoding all the control data from the control region 300. Although FIG. 5 shows the virtual carrier occupying frequency resources below the centre band, in general the virtual carrier may be at any suitable location within the host carrier 320. for example, above the centre band and/or in a frequency range overlapping with the centre band.

As can be seen from FIG. 5, data transmitted on the virtual carrier 501 is transmitted across a limited bandwidth. This could be any suitable bandwidth providing it is smaller than that of the host carrier. This enables low capability terminals (for example MTC type terminals) to be provided with simplified receiver units yet still be able to operate within a communication network which, as explained above, conventionally requires terminals to be equipped with receivers capable of receiving and processing a signal across the entire bandwidth of the carrier.

Also, as can be seen in FIG. 5, the final symbols of the virtual carrier can be reserved as a virtual carrier control region 502 which is allocated for the transmission of control data indicating which resource elements of the virtual carrier 501 have been allocated. The virtual carrier control region can be located at any suitable position within the virtual carrier for example in the first few symbols of the virtual carrier. In the example of FIG. 5 this could mean positioning the virtual carrier control region on the fourth, fifth and sixth symbols. However, fixing the position of the virtual carrier control region in the final symbols of the sub-frame can provide an advantage because the position of the virtual carrier control region need not vary even if the number of symbols of the host carrier control region varies. This simplifies the processing undertaken by mobile communication terminals receiving data on the virtual carrier because there is no need for them to determine the position of the virtual carrier control region every sub-frame as it is known that it will always be positioned in the final symbols of the sub-frame.

Optionally, the virtual carrier control symbols may reference virtual carrier transmissions in a separate sub-frame.

In some examples the virtual carrier may be located within the centre band 310 of the downlink sub-frame. This would minimise the reduction in host carrier PDSCH resources caused by the insertion of a virtual carrier since the resources occupied by the PSS/SSS and PBCH would be contained within the virtual carrier region and not the host carrier PDSCGH region. Therefore, depending on for example the expected virtual carrier throughput, the location of a virtual carrier can be appropriately chosen to either exist inside or outside the centre band according to whether the host or virtual carrier is chosen to bear the overhead of the PSS, SSS and PBCH.

Figure 6:
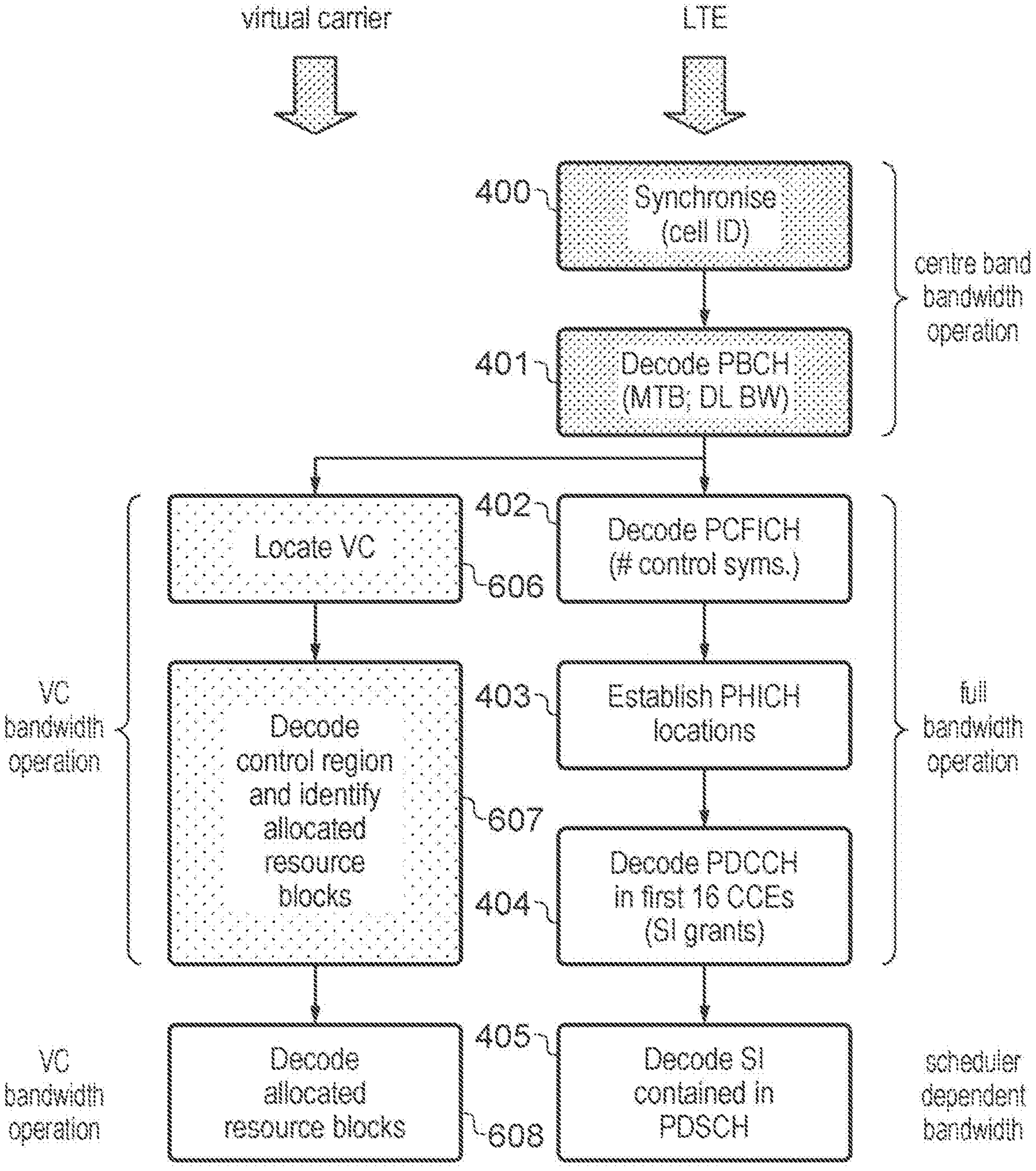
FIG. 6 provides a schematic diagram illustrating an adapted LTE "camp-on" procedure for camping on to a virtual carrier.
Figure 7:
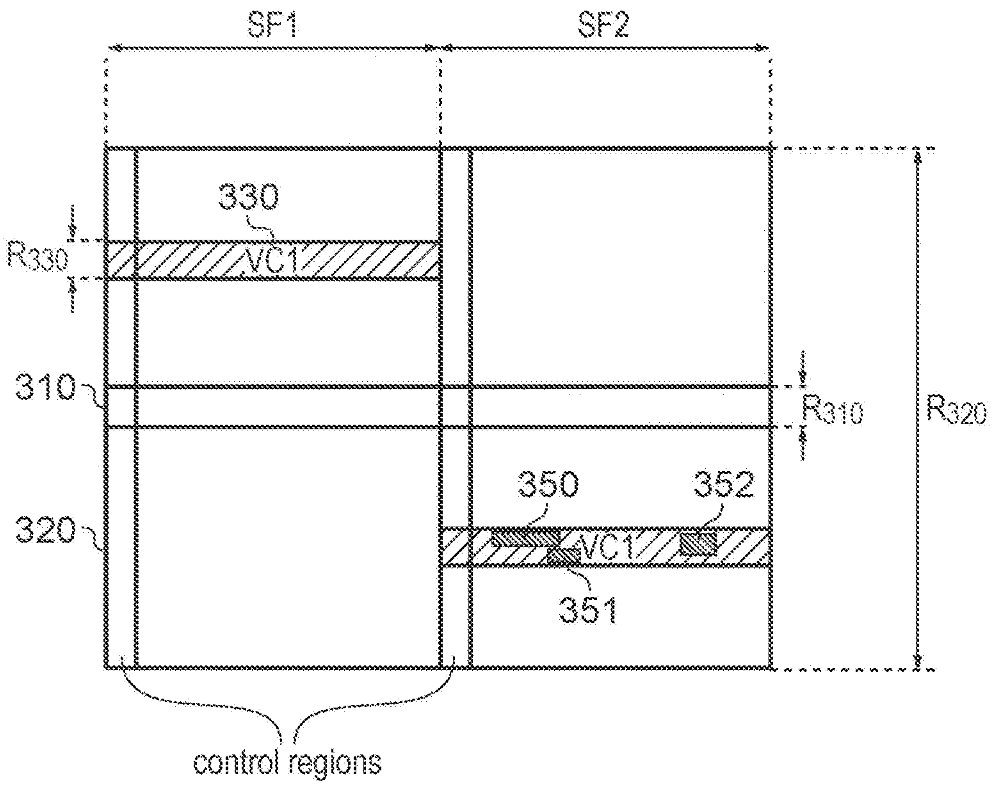
FIG. 7 provides a schematic diagram illustrating LTE downlink radio sub-frames.

FIG. 6 shows a flow diagram illustrating a camp-on process for a virtual channel. In the example of FIG. 6, the first steps 400 and 401 are the similar to the conventional camp-on process shown in FIG. 4. At step 606, the virtual carrier terminal locates a virtual carrier, if any is provided within the host carrier. Once the virtual carrier terminal has located a virtual carrier, it can access information within the virtual carrier. For example, if the virtual carrier mirrors the conventional LTE resource allocation method, the virtual carrier terminal may then decode control portions within the virtual carrier, which can for example indicate which resource elements within the virtual carrier have been allocated for a specific virtual carrier terminal or for system information. For example, FIG. 7 shows the blocks of resource elements 350 to 352 within virtual carrier 330 that have been allocated for the sub-frame SF2. As discussed above, the virtual carrier terminal has to locate the virtual carrier before it can receive and decode the virtual carrier transmissions. Several options are available for the virtual carrier presence and location determination, which can be implemented separately or in combination. Some of these options are discussed below.

To facilitate the virtual carrier detection, the virtual carrier location information may be provided to the virtual carrier terminal such that it can locate the virtual carrier, if any exists, more easily. For example, such location information may comprise an indication that one or more virtual carriers are provided within the host carrier or that the host carrier does not currently provide any virtual carrier. It may also comprise an indication of the virtual carrier's bandwidth, for example in MHz or blocks of resource elements. Alternatively, or in combination, the virtual carrier location information may comprise the virtual carrier's centre frequency and bandwidth, thereby giving the virtual carrier terminal the exact location and bandwidth of any active virtual carrier. In the event that the virtual carrier is to be found at a different frequency position in each sub-frame, according for example to a pseudo-random hoping algorithm, the location information can for example indicate a pseudo random parameter. Such parameters may include a starting frame and parameters used for the pseudo-random algorithm. Using these pseudo-random parameters, the virtual carrier terminal can then know where the virtual carrier can be found for any sub-frame.

Depending on the amount of virtual carrier location information provided, the virtual carrier terminal can either adjust its receiver to receive the virtual carrier transmissions, or it may require further location information before it can do so.

If for example, the virtual carrier terminal was provided with location information indicating a virtual carrier presence and/or a virtual carrier bandwidth but not indicating any details as to the exact virtual carrier frequency range, or if the virtual carrier terminal was not provided with any location information, the virtual carrier terminal can then scan the host carrier for a virtual carrier (e.g. performing a so-called blind search process). Scanning the host carrier for a virtual carrier can be based on different approaches, some of which will be presented below.

As explained above, in LTE the number of symbols that make up the control region of a downlink sub-frame varies dynamically depending on the quantity of control data that needs to be transmitted. Typically, this variation is between one and three symbols. As will be understood with reference to FIG. 5, variation in the width of the host carrier control region will cause a corresponding variance in the number of symbols available for the virtual carrier. For example, as can be seen in FIG. 5, when the control region is three symbols in length and there are 14 symbols in the sub-frame, the virtual carrier is eleven symbols long. However, if in the next sub-frame the control region of the host carrier were reduced to one symbol, there would be thirteen symbols available for the virtual carrier in that sub-frame.

When a virtual carrier is inserted into a LTE host carrier, mobile communication terminals receiving data on the virtual carrier need to be able to determine the number of symbols in the control region of each host carrier sub-frame to determine the number of symbols in the virtual carrier in that sub-frame if they are to be able to use all available symbols that are not used by the host carrier control region.

Conventionally, the number of symbols forming the control region is signalled in the first symbol of every sub-frame in the PCFICH. However, the PCFICH is typically distributed across the entire bandwidth of the downlink LTE sub-frame and is therefore transmitted on sub-carriers which virtual carrier terminals capable only of receiving the virtual carrier cannot receive. Accordingly, in one embodiment, any symbols across which the control region could possibly extend are predefined as null symbols on the virtual carrier, i.e. the length of the virtual sub-carrier is set at (m−n) symbols, where m is the total number of symbols in a sub-frame and n is the maximum number of symbols of the control region. Thus, resource elements are never allocated for downlink data transmission on the virtual carrier during the first n symbols of any given sub-frame.

Although this embodiment is simple to implement it will be spectrally inefficient because during sub-frames when the control region of the host carrier has fewer than the maximum number of symbols, there will be unused symbols in the virtual carrier.

In another embodiment, the number of symbols in the control region of the host carrier is explicitly signalled in the virtual carrier itself. In one example an explicit indication of the host carrier control region size is given by certain information bits in the virtual carrier control region. In another example, the virtual carrier includes a predefined signal, the location of which indicates the number of symbols in the control region of the host carriers. For example, a predefined signal could be transmitted on one of three predetermined blocks of resource elements. When a terminal receives the sub-frame it scans for the predefined signal. If the predefined signal is found in the first block of resource elements this indicates that the control region of the host carrier comprises one symbol; if the predefined signal is found in the second block of resource elements this indicates that the control region of the host carrier comprises two symbols and if the predefined signal is found in the third block of resource elements this indicates that the control region of the host carrier comprises three symbols.

In another example, the virtual carrier terminal is arranged to first attempt to decode the virtual carrier assuming that the control region size of the host carrier is one symbol. If this is not successful, the virtual carrier terminal attempts to decode the virtual carrier assuming that the control region size of the host carrier is two and so on, until the virtual carrier terminal successfully decodes the virtual carrier.

As is known in the art, in OFDM based transmission systems such as LTE a number of sub-carriers in each symbol are typically reserved for the transmission of reference signals. The reference signals are transmitted on sub-carriers distributed throughout a sub-frame across the channel bandwidth and across the OFDM symbols. The reference signals are arranged in a repeating pattern and can thus be used by a receiver, employing extrapolation and interpolation techniques to estimate the channel function applied to the data transmitted on each sub-carrier. In LTE the positions of the reference signal bearing sub-carriers within each sub-frame are pre-defined and are therefore known at the receiver of each terminal.

In LTE downlink sub-frames, reference signals from each transmit antenna port are typically inserted on every sixth sub-carrier. Accordingly, if a virtual carrier is inserted in an LTE downlink sub-frame, even if the virtual carrier has a minimum bandwidth of one resource block (i.e. twelve sub-carriers) the virtual carrier will include at least some reference signal bearing sub-carriers.

There are sufficient reference signal bearing sub-carriers provided in each sub-frame such that a receiver need not accurately receive every single reference signal to decode the data transmitted on the sub-frame. However, as will be understood the more reference signals that are received, the better a receiver will be able to estimate the channel response and hence fewer errors are typically introduced into the data decoded from the sub-frame. Accordingly, in order to preserve compatibility with LTE communication terminals receiving data on the host carrier, in some examples of the present invention, the sub-carrier positions that would contain reference signals in a conventional LTE sub-frame are retained in the virtual carrier.

As will be understood, in some examples, terminals arranged to receive only the virtual carrier receive a reduced number of sub-carriers compared to conventional LTE terminals which receive each sub-frame across the entire bandwidth of the sub-frame. As a result, the reduced capability terminals receive fewer reference signals over a narrower range of frequencies which may result in a less accurate channel estimation being generated.

In some examples a simplified virtual carrier terminal may have a lower mobility which requires fewer reference symbols to support channel estimation. However, in some examples of the present invention the downlink virtual carrier includes additional reference signal bearing sub-carriers to enhance the accuracy of the channel estimation that the reduced capability terminals can generate.

In some examples the positions of the additional reference bearing sub-carriers are such that they are systematically interspersed with respect to the positions of the conventional reference signal bearing sub-carriers thereby increasing the sampling frequency of the channel estimation when combined with the reference signals from the existing reference signal bearing sub-carriers. This allows an improved channel estimation of the channel to be generated by the reduced capability terminals across the bandwidth of the virtual carrier. In other examples, the positions of the additional reference bearing sub-carriers are such that they are systematically placed at the edge of the bandwidth of the virtual carrier thereby increasing the interpolation accuracy of the virtual carrier channel estimates.

Figure 8:
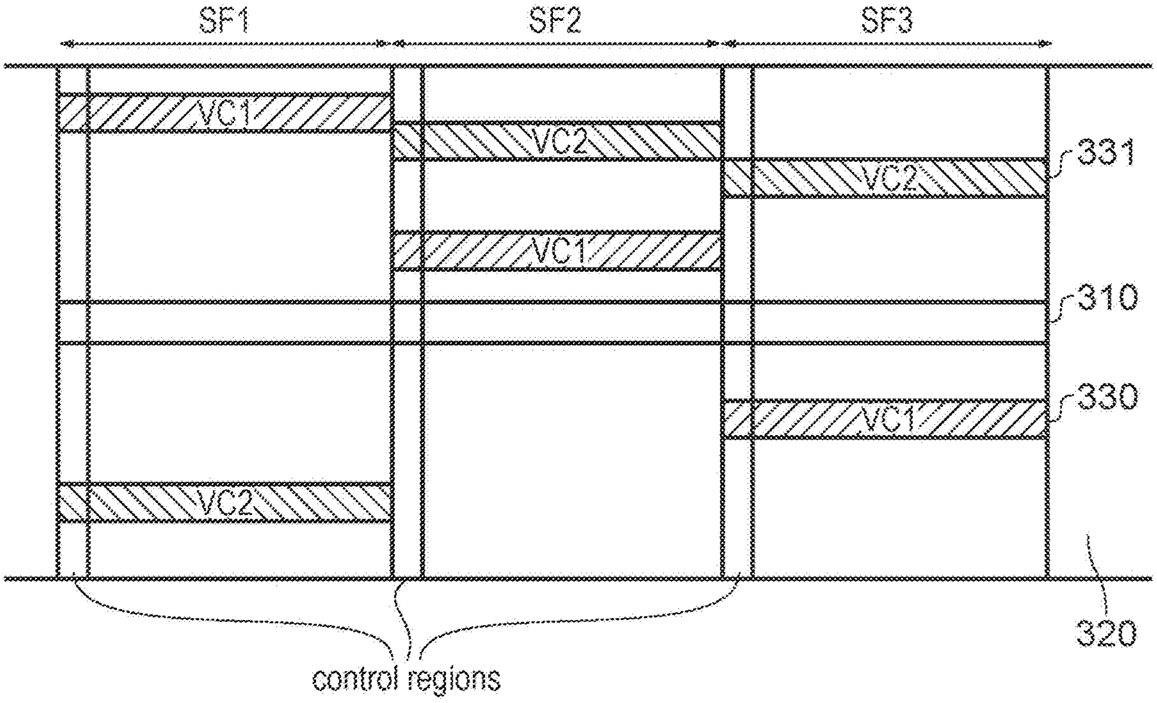
FIG. 8 provides a schematic diagram illustrating a group of sub-frames in which two virtual carriers change location within a host carrier band.

So far examples of the invention have been described generally in terms of a host carrier in which a single virtual carrier has been inserted as shown for example in FIG. 5. However, in some examples a host carrier may include more than one virtual carrier. For example FIG. 8 shows an example in which two virtual carriers VC1 (330) and VC2 (331) are provided within a host carrier 320 and change location within the host carrier band according to a pseudo-random algorithm. However, in other examples, one or both of the two virtual carriers may always be found in the same frequency range within the host carrier frequency range and/or may change position according to a different mechanism In some examples the number of active virtual carriers can be dynamically adjusted such that it fits the current needs of conventional LTE terminals and virtual carrier terminals. The network elements and/or network operator can thus activate or deactivate the virtual carriers whenever appropriate.

The virtual carrier shown for example in FIG. 5 is 144 sub-carriers in bandwidth. However, in other examples a virtual carrier may be of any size between twelve sub-carriers to 1188 sub-carriers (for a carrier with a 1200 sub-carrier transmission bandwidth). Because in LTE the centre band has a bandwidth of 72 sub-carriers, a virtual carrier terminal in an LTE environment preferentially has a receiver bandwidth of at least 72 sub-carriers (1.08 MHz) such that it can decode the centre band 310, therefore a 72 sub-carrier virtual carrier may provide a convenient implementation option. With a virtual carrier comprising 72 sub-carriers, the virtual carrier terminal does not have to adjust the receiver's bandwidth for camping on the virtual carrier which may therefore reduce complexity of performing the camp-on process, but there is no requirement to have the same bandwidth for the virtual carrier as for the centre band and, as explained above, a virtual carrier based on LTE can be of any size between 12 to 1188 sub-carriers.

In a situation where a virtual carrier is provided, there might be duplication of some data broadcasted to a mobile terminal in the host carrier and in the virtual carrier. For example, because the virtual carrier is "hosted" in the host carrier, some of the system information transmitted in respect of the host carrier might be relevant for terminals in the virtual carrier. Because the two carriers are treated as being logically independent, it is generally recognized that the duplication of such information is necessary and unavoidable to ensure that each of the carriers is autonomous.

In a first example embodiment, the host carrier and virtual carrier may each comprise a grant or allocation information pointing to the same data comprising broadcast and/or multicast information. Broadcast and/or multicast information refers for example to information that is not unicast information. Unicast information is information that is sent to one specific terminal only.

For example, in FIG. 3, resource allocation 340 is for a terminal identified as "UE 4" and is not for any other terminal. Such information is sent as unicast information because it is sent to this terminal only. In that case, the control region comprises a PDCCH allocation message, also called "grant", for the allocated resources 340, where this message has been scrambled with the RNTI for UE 4, where the RNTI is a unique identifier for the terminal in at least the carrier, or the cell. In another example, also in FIG. 3, system information may be sent in a carrier, for example in the resources allocation 344. This is generally sent to all terminals in the cell using this carrier. In LTE, a PDCCH allocation message for system information is generally scrambled with a system information RNTI (SI-RNTI) which is used to identify data sent to all terminals using this carrier. System information is an example of broadcasted information. It has to be noted that the base station or base stations sending broadcast information may not know whether any terminal will actually read the data in the allocated resources.

Figure 9:
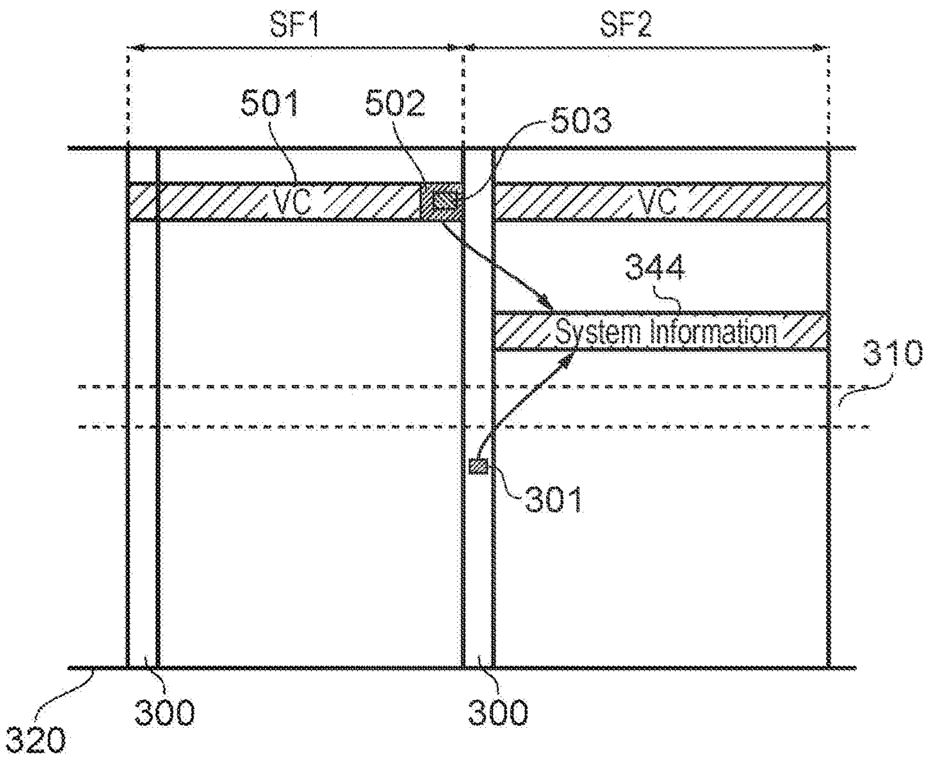
FIG. 9 provides a schematic diagram illustrating a virtual carrier and a host carrier each comprising an allocation message linked to allocated resources in the host carrier.

In the example of FIG. 9, where two sub-frames SF1 and SF2 have been represented in the interest of conciseness, a virtual carrier 501 is provided within a host carrier 320. In the second sub-frame SF2, system information is broadcasted within the host carrier in the allocated resources 344. It is generally expected that a resource allocation message, or grant, 301 may be found in the control region 301 of the host carrier, the grant pointing to the allocated resources 344. In an example of the present invention, an allocation message or grant 503 may also be found in the virtual carrier 501, e.g. in the control region 502 of the virtual carrier. This grant 503 does not point to allocated resources in the virtual carrier, as would be expected from such a grant, but, in this example, it points to allocated resources 344 in the host carrier. In the example of FIG. 9, if a terminal using the virtual carrier decodes the grant 503, the terminal may then decide either to decode—or continue decoding—data transmitted in the virtual channel or to re-configure its receiver to receive and decode the data (or some data) transmitted in the allocated resources 344 comprising system information. Thus, terminals using the host carrier and terminals using the virtual carrier can find and decode the system information required to communicate on both carriers using the same system information 344 sent in the host carrier only.

In the event that the virtual carrier is provided with certain constraints, for example a maximum bandwidth for the virtual carrier, some of these constraints may have to be applied to the allocated resources that are being pointed to. For example, if a mobile network provides one or more virtual carriers for terminals having a receiver with a capacity limited to 72 sub-carriers (i.e. the bandwidth of 6 resource blocks), it may then be appropriate for the base station or base stations providing the multicasted/broadcasted information to apply the same constraint to this multicasted/broadcasted information, i.e. in that example the bandwidth of the multicasted/broadcasted information would be equal to or less than 72 sub-carriers.

Figure 10:
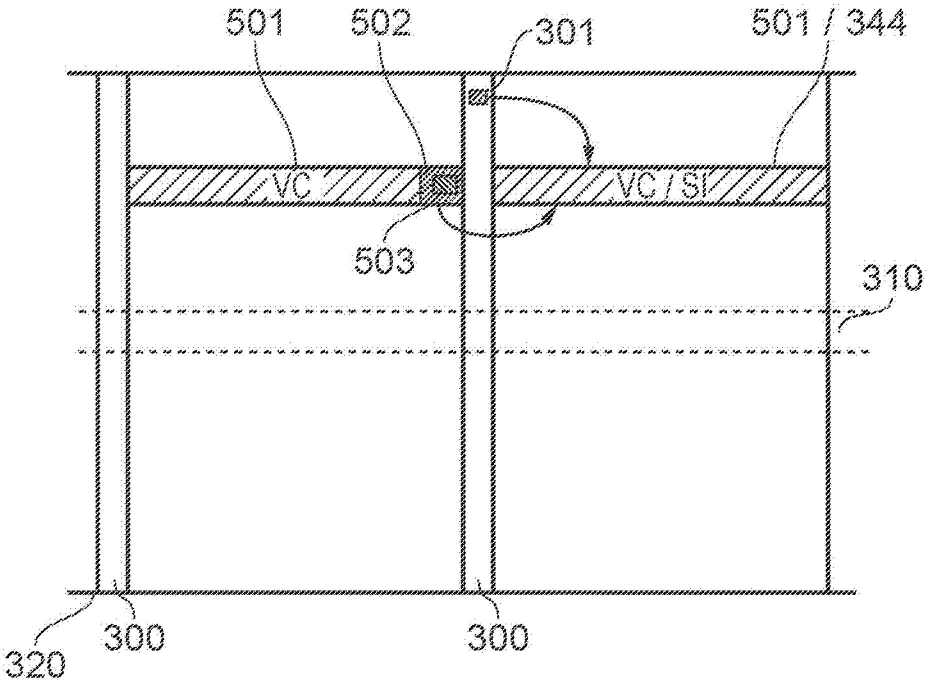
FIG. 10 provides a schematic diagram illustrating a virtual carrier and a host carrier each comprising an allocation message linked to allocated resources in the virtual carrier.

In the example of FIG. 9, the multicasted/broadcasted information is provided within the host carrier, however this multicasted/broadcasted information may also be provided within the virtual carrier, as illustrated in FIG. 10. In the example of FIG. 10, the multicasted/broadcasted information is system information sent in the allocated resources 344 where these allocated resources are provided within the virtual carrier 501. In that case, the virtual carrier 501 comprises an allocation message or grant 503 pointing to the system information 344 in the virtual carrier 501 in the next sub-frame. Where, in legacy systems, the host carrier 320 would only comprise allocation messages or grant pointing to resources allocated in this host carrier, in the present example, the host carrier 320 also comprises an allocation message or grant 503 pointing to allocated resources 344 containing system information and provided in the virtual carrier 501. This has the advantage that a terminal with limited bandwidth capability using the virtual carrier will not need to retune its receiver to a different centre frequency in order to receive the system information message. A terminal communicating via the host carrier 320 may for example decode the grant 301 and, if the terminal decides to decode the system information in the allocated resources 344, the terminal simply does so according to the allocation message 301. Thus, terminals using the host carrier and terminals using the virtual carrier can find and decode the system information sent in the virtual carrier only.

Figure 11A:
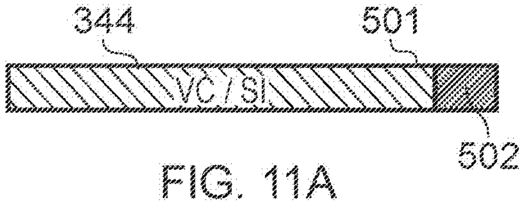
FIGS. 11A-11C provide schematic illustrations of common information carried in a virtual carrier.
Figure 11C:
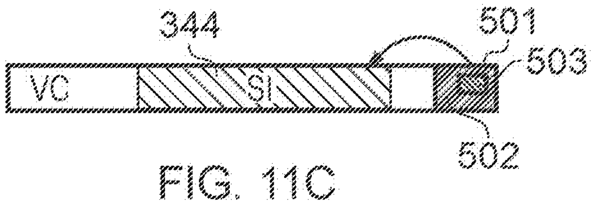
Figure 11B:

In the examples of FIGS. 11A, 11B and 11C, there has been shown two examples for providing the system information within the virtual carrier 501. In the example of FIG. 11A, the system information uses all or substantially all the resources available in a sub-frame for transmitting data in the virtual carrier. In this example, resources 502 are reserved in a sub-frame to provide a control portion in the virtual carrier. However in other examples, for example in FIG. 11B, there may not be any resources reserved for the transmission of control information. In that case, all or substantially all resources 344 in the virtual carrier 501 for a sub-frame may be used for sending the system information, where no resources have been reserved for any other use.

Figure 12:
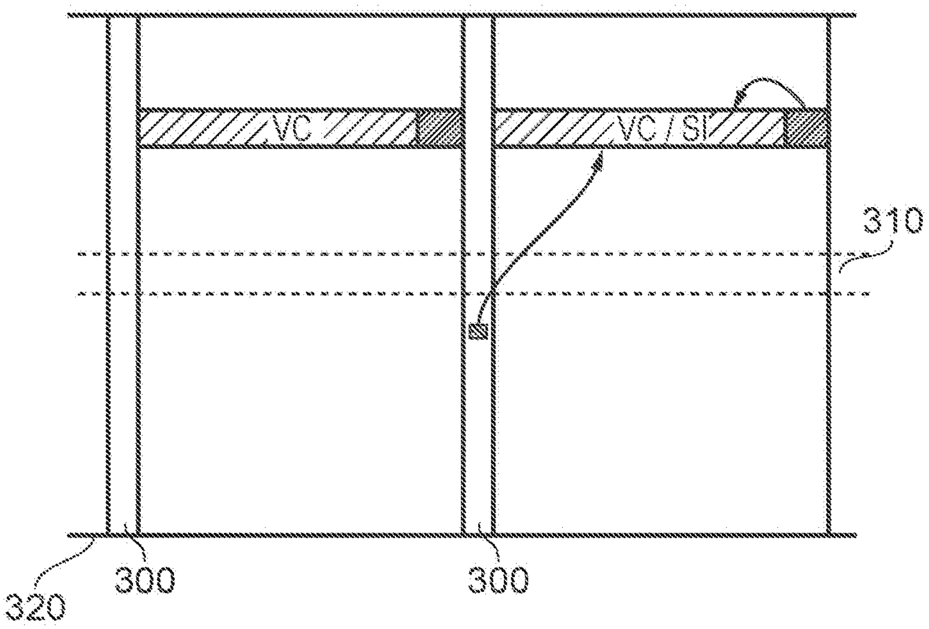
FIG. 12 provides schematic diagrams illustrating a virtual carrier and a host carrier each comprising an allocation message linked to allocated resources in the virtual carrier.

In the example of FIG. 11C, the system information 344 is sent in only some, but not all, of the resources available for transmitting data via the virtual carrier 501 for this sub-frame. In that example, resources 502 have also been reserved for sending control information however in other examples there may not be any resources reserved for control information. Also, in the example of FIG. 10, the virtual carrier allocation message 503 pointing to the system information was provided in the sub-frame preceding the sub-frame providing this system information. In the example of FIG. 11C, the grant 503 may be provided in the same sub-frame as the system information that it points to, as illustrated by the arrow pointing from the resource allocation 503 to the system information 344. Such an example is similar to the example illustrated in FIG. 12, where the grant 503 is provided in the same sub-frame as the system information. In the example of FIG. 12, it has not been detailed how the system information is provided within the host carrier. It may for example be similar to the illustrations of FIGS. 11A-11C, or provided differently.

The system information 344 may also be provided in the virtual carrier 501 in a manner similar to that illustrated in FIG. 10, that is with the resource allocation 503 being provided in the, or a, previous sub-frame. For example, the grant 503 of 11C might actually be pointing to multicasted/broadcasted information or to unicast information in the, or a, next sub-frame.

There has therefore been provided a system and method where terminals can use a host carrier or a virtual carrier provided within the host carrier to receive data, where the two carriers are provided in an autonomous manner, where information which is of interest to terminals in the virtual carrier and in the host carrier can be provided once only, and where a grant or resource allocation is provided in one of the carrier and points to the information provided in the other carrier. As a result, the number of resources allocated for transmitting the multicast/broadcast information can be reduced, thereby improving the throughput and efficiency of the carriers.

Multiple Carriers Example

Figure 13:
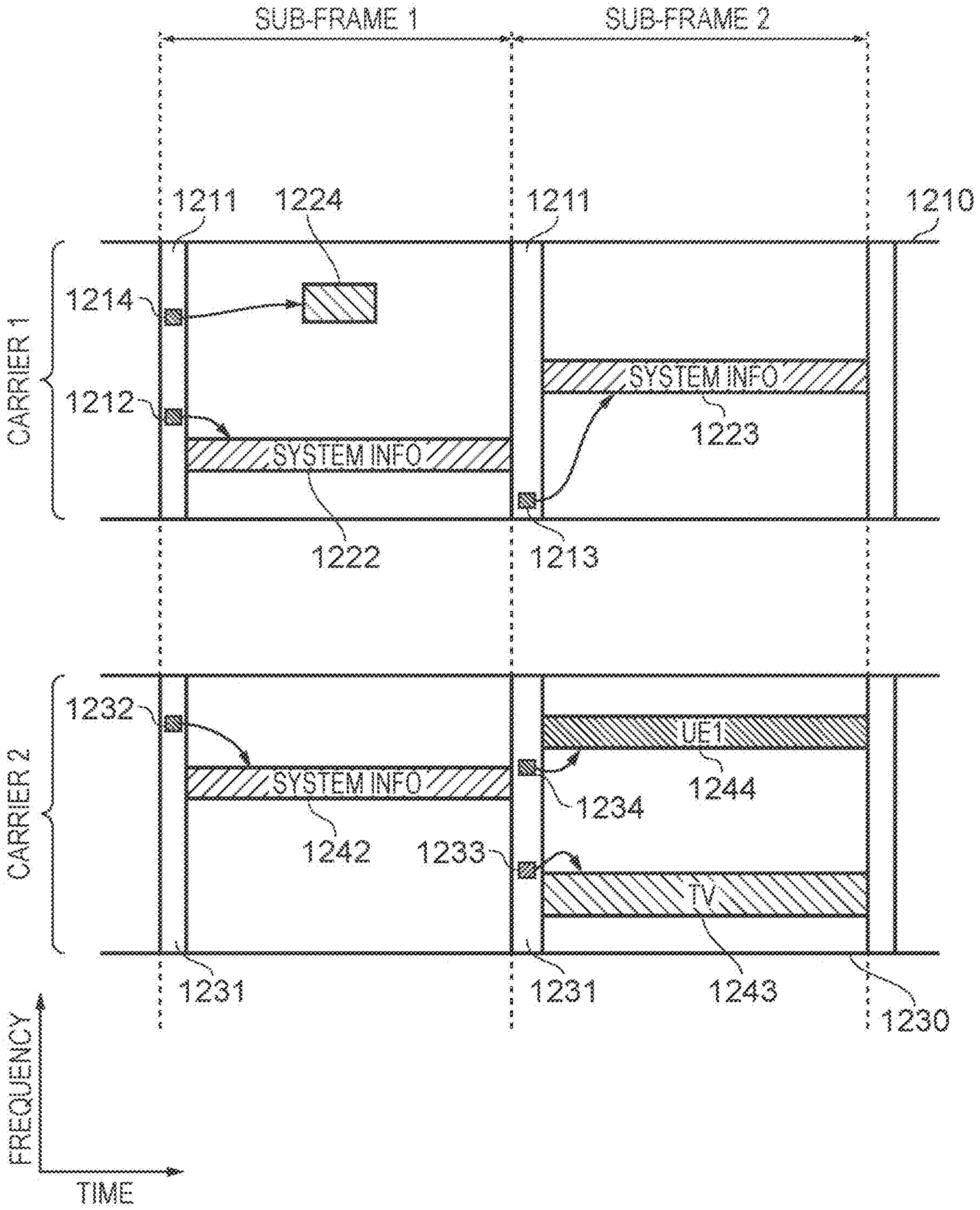
FIG. 13 provides a schematic diagram illustrating of two conventional LTE carriers having separate frequency ranges.

In another example, at least two carriers are provided where the two carriers do not overlap in range and are provided in two separate frequency ranges. An example of two such carriers is illustrated in FIG. 13. Two carriers 1210 and 1230 are provided in two different frequency bands where mobile terminals may use one or both of the carriers in order to receive data transmitted by one or more base stations via the two carriers 1210, 1230. It may be for example that a mobile terminal can use each one of the carriers in a conventional mobile network arrangement, that is, the carrier can be the only downlink carrier via which the mobile terminal receives data from the one or more base stations. For example in the initial releases of the LTE standard, a terminal communicating with a base station usually receives downlink data via one, and only one, downlink carrier. This carrier could for example be "carrier 1" 1210 or "carrier 2" 1230. In a non-conventional situation where a terminal is connected to two (or more) carriers, for example carriers 1210 and 1230, the terminal receives data from both carriers at the same time. Such a terminal can therefore experience an enhanced throughput as it may for example receive at least twice as much data with two carriers rather than one.

Also, as any carrier that may be used as a terminal's only downlink carrier has to provide an autonomous carrier for that terminal, each of the carriers 1210 and 1230 has to provide any terminal using this carrier only with any information they need for using this carrier. As a result, conventionally, allocated resources in one carrier corresponds to an allocation message or grant in the same carrier, in a one-to-one relationship. For example, in FIG. 13, resources 1222 and 1223 allocated for system information and sent in the first carrier 1210 have one corresponding allocation message 1212 and 1213, respectively, so that terminals using the first carrier can find the system information for this carrier. Likewise, the second carrier 1230 comprises resources 1242 allocated for system information and a corresponding allocation message 1232 so that terminals using the second carrier can find and decode the system information. The choice of system information is purely illustrative, as the allocated resources may be for any type of data for one or more terminals. For example, the resources may be allocated for another type of broadcasted or multicasted data such as TV data 1243 which is associated with an allocation message 1233. In another example the transmitted data may be data transmitted for one terminal only (unicast data) as illustrated by the allocated resources 1244 for one terminal identified as "UE 1". Again, the allocated resources 1244 are associated with an allocation message or grant 1234 pointing to the allocated resources.

Figure 14:
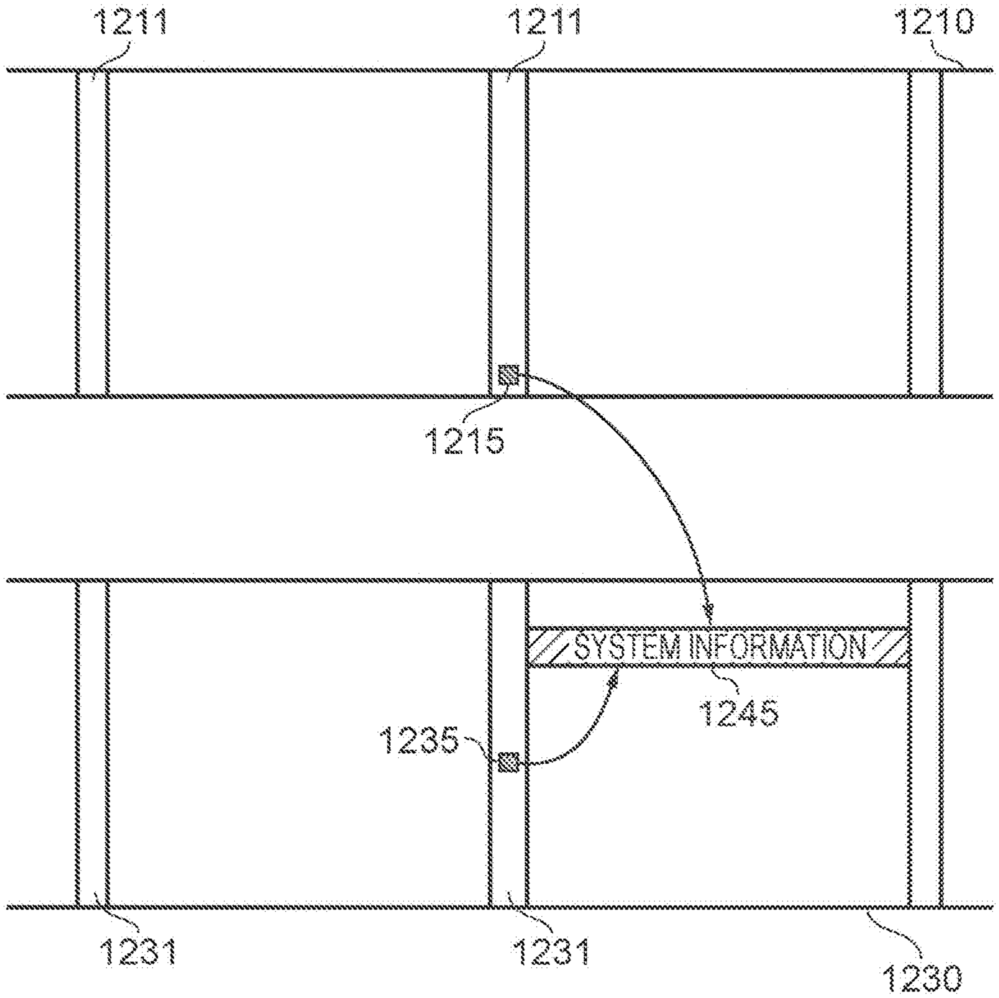
FIG. 14 provides a schematic diagram illustrating two carriers, each comprising an allocation message linked to resources allocated in one of the carriers.

In one example shown in FIG. 14, resources 1245 allocated for system information is provided in a sub-frame of the second carrier 1230. The allocated resources 1245 in the second carrier is associated with a grant or allocation message 1235 in the same carrier, that is, in the second carrier. Advantageously, if resources allocated in the second carrier comprise information for terminals in the first carrier, the first carrier may also comprise a grant or allocation message associated with the allocated resources in the second carrier. Thus, in the example of FIG. 14, if the resources 1235 allocated to system information comprise information in respect of the first carrier 1210, a terminal using the first and second carriers may be directed to system information in the second carrier by the grant 1215 provided in the first carrier.

In another example (not shown), a terminal arranged to use the first and second carriers may be in a waiting or idle state and listening to a paging channel on the first or second carrier. For the ease of illustration, it will be assumed that the terminal is listening to a paging channel on the first carrier, however the same reasoning applies equally if the terminal is listening to the second carrier. Even though the terminal is listening to the first carrier, the one or more base stations providing the first and second carriers may not know which of the first and second carriers' paging channel the terminal is listening to. Using conventional LTE or conventional mobile systems, the one or more base stations would page the terminal on both the first and second carriers, thereby using twice the paging resources that would be used if paging the terminal on the carrier's paging channel it is listening to. In an arrangement similar to the arrangement shown in FIG. 14, the one or more base stations may use only paging channel for paging the terminal, for example a paging channel in the second carrier 1230, and include two grants associated with this paging channel: one grant being in the first carrier 1210 and a second grant being in the second carrier 1230. As a result, the terminal is guaranteed to find the paging channel, whichever carrier it is provided in, and whichever carrier and/or channel the terminal may be listening to, whilst the resources used for paging the terminal have been reduced by half.

Figure 15:
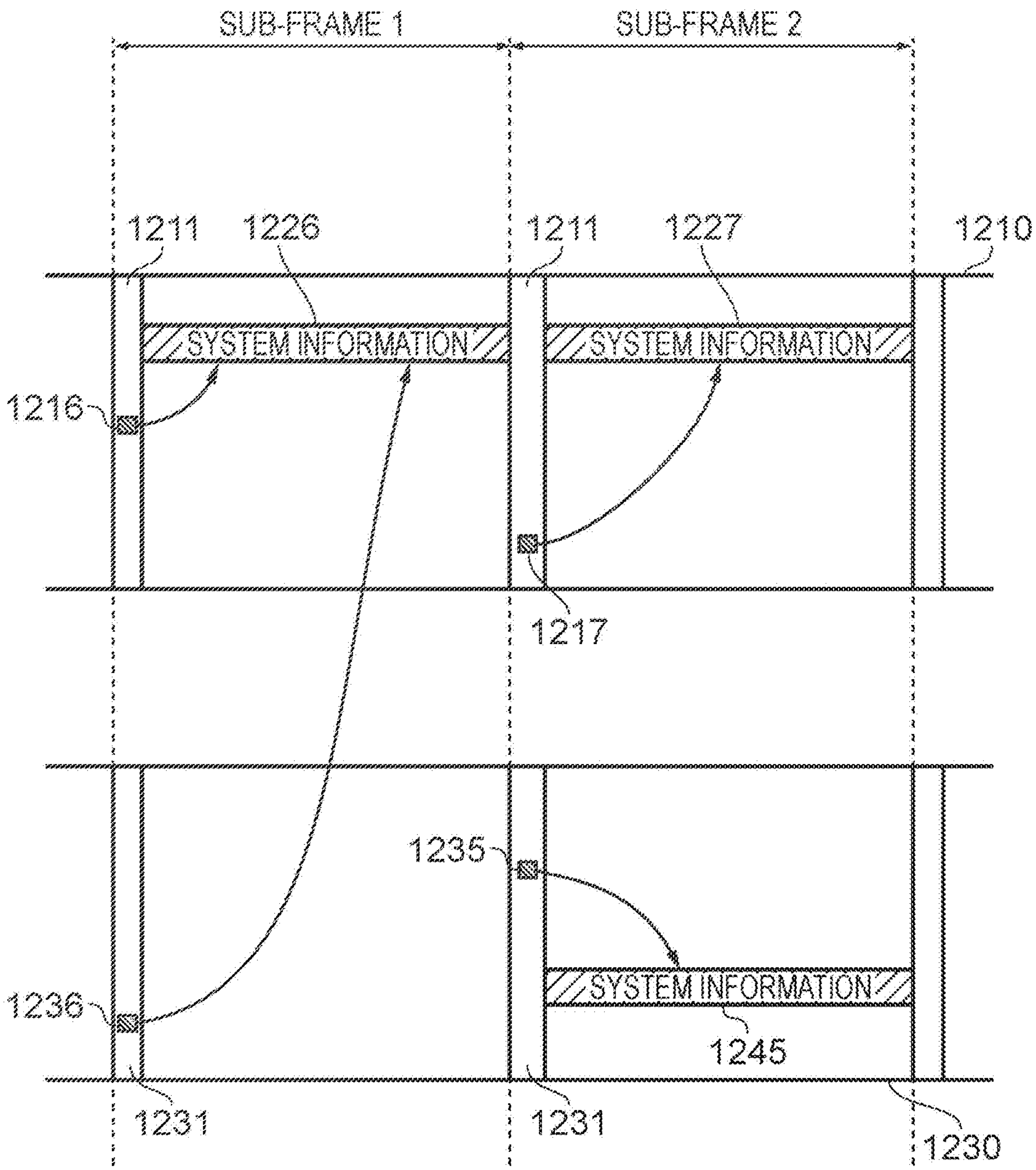
FIGS. 15-17 provide a schematic diagram illustrating various arrangements comprising two carriers, wherein each carrier may comprise an allocation message linked to the resources allocated in one or the other of the carriers.

Each carrier may provide independent broadcasted/multicasted information (e.g. system information for one carrier only), no broadcasted/multicasted data, and/or common broadcasted/multicasted information (e.g. system information for two or more carriers). For example, in the illustration of FIG. 15, the first carrier 1210 provides a first sub-frame system information data 1226 that comprises data of interest for terminals using the first and the second carriers. The first and second carriers 1210 and 1230 both provide a corresponding allocation message 1216 and 1236, respectively, in their control portion 1211 and 1231, respectively. In this example, in the next sub-frame each of the first and second carriers 1210 and 1230 provide system information data 1227 and 1245, respectively, for terminals using this carrier only. Because the system information in a carrier is for terminals using this carrier only, it would be inefficient to include an allocation message in the other carrier and pointing to the system information data. Thus in this example, the first and second carriers 1210 and 1230 provide allocations messages 1217 and 1235, respectively, pointing to their respective multicasted and/or broadcasted system information data 1227 and 1245.

In other examples (not illustrated), the control portion 1211 of the first carrier 1210 for the second sub-frame may also include a grant or allocation message associated with the system information 1245 in the second carrier 1230.

Figure 16:
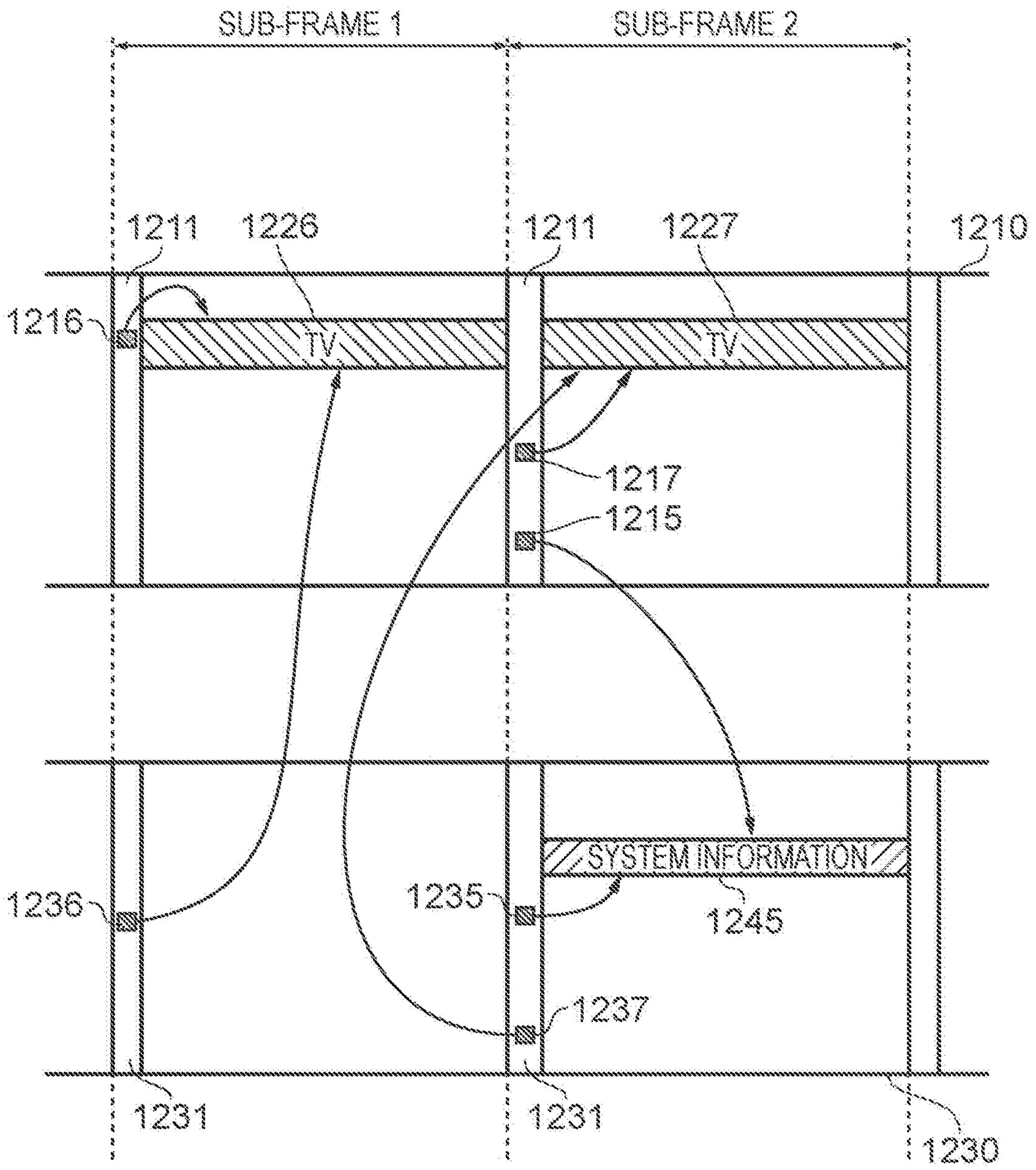

As previously explained, any broadcasted or multicasted information may be associated with multiple allocation messages provided in at least two carriers. The example of FIG. 16 shows a possible combination of TV data broadcasted or multicasted in the first carrier 1210 and system information broadcasted or multicasted in the second carrier 1230. In that example, TV data 1226, 1227 is provided in the first carrier 1310 in the first and second sub-frames and system information 1245 is provided in the second carrier 1330 in the second sub-frame. Each of the resources 1226 and 1227 allocated for TV data is associated with two allocation messages 1216, 1236 and 1217, 1237 respectively. Thus, any terminal using the first carrier 1210 or the second carrier 1230 is provided with an allocation message pointing to the TV data in the first carrier 1210 and can access the TV data if using the two carriers. For example, if an operator wishes to have a carrier dedicated for certain broadcast services, such as Multimedia Broadcast Multicast Service (MBMS), TV services, or any other type or broadcasted or multicasted services, the operator can dedicate the first carrier to such services, and use the second carrier as a conventional carrier. Conventional and low-end terminals may then use the second carrier in a conventional manner while more advanced terminals may use the first carrier for these certain services and the second carrier for all services except these certain services, possibly using both carriers at the same time.

In the example of FIG. 16, there is also provided system information 1245 broadcasted in the second sub-frame of the second carrier 1230 that has two grants 1215 and 1235 associated with it, the first one being in the first carrier 1210 and the second one being in the second carrier 1230.

Figure 17:
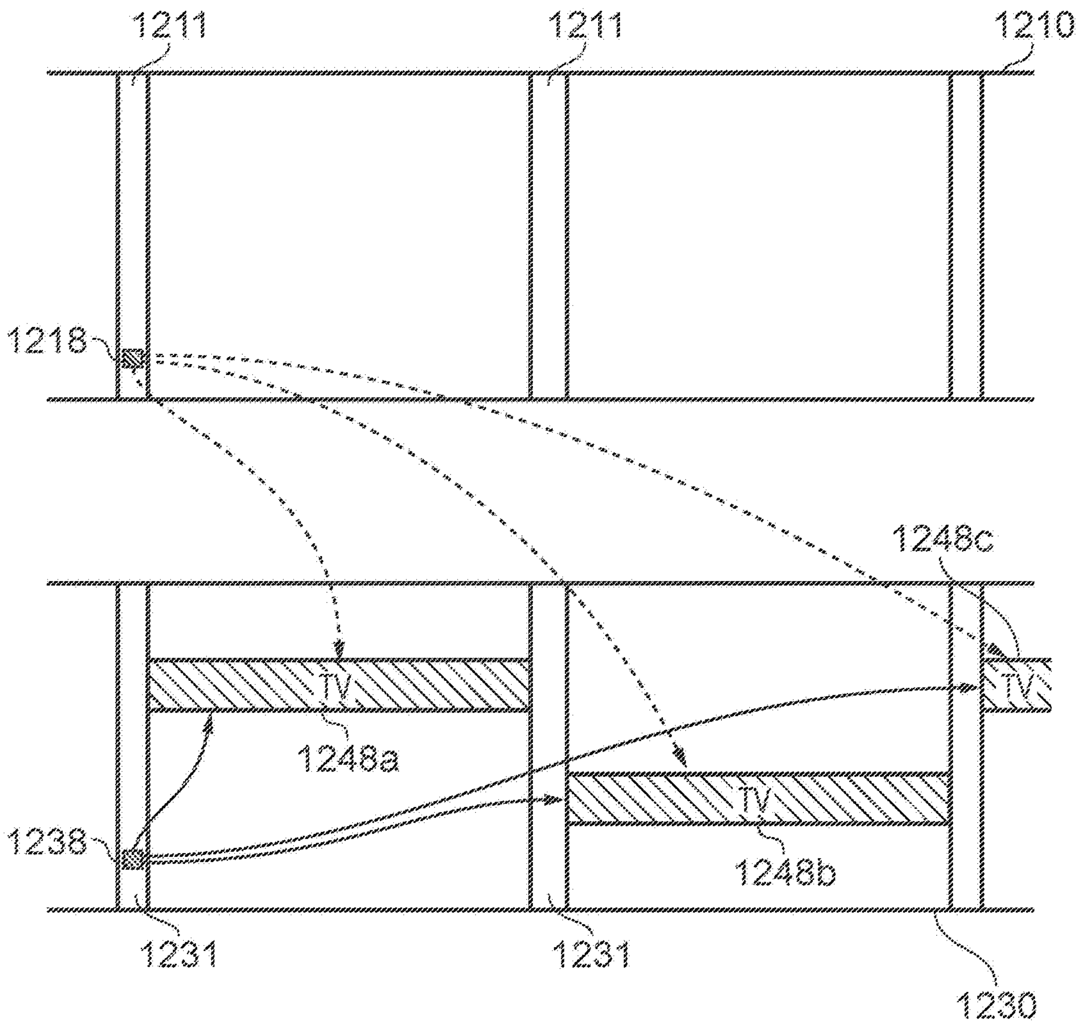

Also, generally the examples have been illustrated where one block of allocated resources in one sub-frame is associated with (at least) one grant in the same sub-frame. However, the invention is not limited to that arrangement and, for example, the grant or allocation message may be in another sub-frame and/or there may be less or more allocation messages per sub-frame than blocks of allocated resources. For example, FIG. 17 illustrates an example where one grant 1238 in the second carrier 1230 is associated with at least three blocks of resources for TV in the second carrier 1230 and one grant 1248 in the first carrier 1210 is associated with at least three blocks of resources for TV 1248*a*, 1248*b*, 1248*c* in the first carrier. For example, the resources may be changing from sub-frame to sub-frame in pseudo-random fashion and one grant may be sufficient for indicating the position of the resources allocated for a service or a user for more than one sub-frame.

Figure 18:
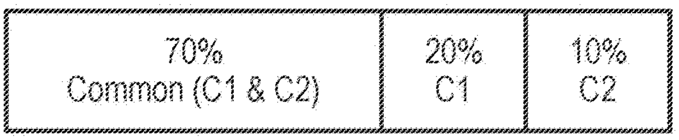
FIG. 18 provides a schematic diagram illustrating of partitioning of common information in a two carrier example.

As illustrated in FIG. 18, broadcasted or multicasted information associated with multiple allocation messages provided in at least two carriers may be partitioned in parts comprising information for terminals in one carrier and/or parts comprising information for terminals in one carrier in a set of carriers, wherein a set of carriers is a group of any two or more carriers. In the example of FIG. 18, the common information (broadcasted or multicasted information) comprises a part for information common to two carriers C1 and C2, a part for information in respect of carrier C1 and a part for information in respect of C2. In this example, each part represents 70%, 20% and 10% of the resources allocated to the common information, respectively. However each of these parts may represent any suitable percentage of the resources allocated to the common information in the 0%-100% range. Also, if the broadcasted or multicasted information comprises information for more than two carriers, the common information may be partitioned in any appropriate manner so that relevant information in respect of these two or more carriers can be included in the common information.

Also, the partitioning of the common information may be fixed or may vary. For example it may vary on a per frame basis, or based on a number in each carrier of terminals which will possibly access the common information, or based on any other suitable factor or parameter.

Also, the examples shown in the accompanying Figures are for illustration only and are not limiting. For example, the allocated resources may not extend across the entirety of resources available for data transmission in a sub-frame, as illustrated with 1222, 1223, 1242, 1243 and 1244 of FIG. 13, but may only extend across a portion of these available resources as illustrated with allocated resources 1224 of FIG. 13. Also, the allocation message in a carrier has generally been shown in the same sub-frame as the allocated resources of the same carrier, for example grant 1214 and resources 1224, as this is the conventional relative arrangement of allocation messages and allocated resources in LTE, however the grant may be in a different sub-frame to the allocated resources.

Likewise, the examples generally show two carriers in order to illustrate the invention, however the invention is not limited to two carriers and any number of carriers equal or higher than two can be suitable for using the invention.

Generally, the invention has been described in an LTE environment as the invention can be advantageously implemented in this environment, however the invention is not limited to an LTE environment and may be implemented in any other suitable environment.

CONCLUSION

Various modifications can be made to examples of the present invention. Embodiments of the present invention have been defined largely in terms of reduced capability terminals transmitting data via a virtual carrier inserted in a conventional LTE based host carrier. However, it will be understood that any suitable device can transmit and receive data using the described virtual carriers for example devices which have the same capability as a conventional LTE type terminal or devices which have enhanced capabilities.

Likewise, system information is only an example of broadcasted/multicasted information used in illustrative embodiments and the invention is not limited to system information. In fact, any suitable type of information may be used with the invention. Such types of information may for example also include paging, TV services, MBMS, group information, etc.

Furthermore, in all embodiments, each carrier may provide independent broadcasted/multi-cast information (e.g. system information for one carrier only), no broadcasted/multi-cast data, and/or common broadcasted/multi-cast information (e.g. system information for two or more carriers).

Furthermore, it will be understood that the general principle of inserting a virtual carrier on a subset of uplink or downlink resources can be applied to any suitable mobile telecommunication technology and need not be restricted to systems employing an LTE based radio interface.

What is claimed is:

1. A device configured as a first mobile unit in a wireless communication system that includes a base station, the device comprising:
- a transceiver; and
- control circuitry configured to:
  - receive a transmission from the base station via one of a first carrier or a virtual carrier of the base station,
  - wherein the first carrier comprises a first set of physical resources of a host carrier,
  - wherein the virtual carrier comprises a second set of physical resources of the host carrier that are logically separate from the first set of physical resources of the host carrier,
  - wherein the first carrier provides a first communication channel for the first mobile unit,
  - wherein the virtual carrier provides a second communication channel for a second mobile unit different from the first mobile unit,
  - wherein the transmission via the first carrier includes first allocation information about a location, outside of the virtual carrier and within the first carrier, of information that is common to the first carrier and the virtual carrier regarding communications with the base station via each of the first carrier and the virtual carrier, and
  - wherein the transmission via the virtual carrier includes second allocation information about the location outside of the virtual carrier and within the first carrier of the information that is common to the first carrier and the virtual carrier;
  - access the common information within the first carrier; and
  - communicate with the base station via one of the first or virtual carriers in accordance with the common information,
  - wherein the virtual carrier comprises a virtual carrier control portion and a virtual carrier data portion,
  - wherein the first allocation information, that is transmitted via the first transmission via the first carrier and that is about the location of the information that is common to the first carrier and the virtual carrier within the first carrier, is located in a predetermined control region of a subframe of the host carrier, and
  - wherein the second allocation information, that is transmitted via the second transmission via the virtual carrier and that is also about the location of the information that is common to the first carrier and the virtual carrier within the first carrier, is located in a dedicated sub-portion of the virtual carrier control portion.

2. The device according to claim 1, wherein the host carrier comprises a first subframe that is contiguous with a second subframe, and wherein the subframe of the host carrier that contains the first allocation information and the subframe of the host carrier that contains the second allocation information are different ones of the first subframe or the second subframe.

3. The device according to claim 2, wherein the first subframe of the host carrier comprises a first control region and a first data region, and wherein the second subframe of the host carrier comprises a second control region and a second data region.

4. The device according to claim 1, wherein the control circuitry is configured:

to receive the transmission from the base station only via the first carrier, and to only communicate with the base station via the first carrier in accordance with the common information and first carrier specific information, or to receive the transmission from the base station only via the virtual carrier, and to only communicate with the base station via the virtual carrier in accordance with the common information and virtual carrier specific information.

5. The device according to claim 4, wherein communications with the base station via the first carrier includes communications via the first set of physical resources and excludes communications via the second set of physical resources, and wherein communications with the base station via the virtual carrier includes communications via the second set of physical resources and excludes communications via the first set of physical resources.

6. The device according to claim 1, wherein the first set of physical resources comprises first physical resources in each of first and second regions of the host carrier, and wherein the second set of physical resources comprises second physical resources, different from the first physical resources, in each of the first and second regions of the host carrier.

7. The device according to claim 1, wherein the first set of physical resources comprise a first plurality of frequencies of a plurality of frequencies of the host carrier, and wherein the second set of physical resources comprise a second plurality of frequencies that are contiguous and that are located within the first plurality of frequencies that comprise the first set of physical resources.

8. A device configured as a base station in a wireless communication system that includes a first mobile unit and a second mobile unit different from the first mobile unit, the device comprising:

a transceiver; and control circuitry configured to perform:

a first transmission to the first mobile unit via a first carrier, and a second transmission to the second mobile unit via a virtual carrier, wherein the first carrier comprises a first set of physical resources of a host carrier, wherein the virtual carrier comprises a second set of physical resources that is logically separate from the first set of physical resources of the host carrier, wherein the first carrier provides a first communication channel for the first mobile unit, wherein the virtual carrier provides a second communication channel for the second mobile unit, wherein the first transmission via the first carrier includes first allocation information about a location, outside of the virtual carrier and within the first carrier, of information that is common to the first carrier and the virtual carrier regarding communications with the base station via each of the first carrier and the virtual carrier, and wherein the second transmission via the virtual carrier includes second allocation information about the location outside of the virtual carrier and within the first carrier of the information that is common to the first carrier and the virtual carrier;

after the first and second mobile units access the common information within the first carrier, communicate with the first and second mobile units via respective ones of the first or virtual carriers in accordance with the common information, wherein the virtual carrier comprises a virtual carrier control portion and a virtual carrier data portion, wherein the first allocation information, that is transmitted via the first transmission via the first carrier and that is about the location of the information that is common to the first carrier and the virtual carrier within the first carrier, is located in a predetermined control region of a subframe of the host carrier, and wherein the second allocation information, that is transmitted via the second transmission via the virtual carrier and that is also about the location of the information that is common to the first carrier and the virtual carrier within the first carrier, is located in a dedicated sub-portion of the virtual carrier control portion.

9. The device according to claim 8, wherein the host carrier comprises a first subframe that is contiguous with a second subframe, and wherein the subframe of the host carrier that contains the first allocation information and the subframe of the host carrier that contains the second allocation information are different ones of the first subframe or the second subframe.

10. The device according to claim 9, wherein the first subframe of the host carrier comprises a first control region and a first data region, and wherein the second subframe of the host carrier comprises a second control region and a second data region.

11. The device according to claim 8, wherein the first set of physical resources comprises first physical resources in each of first and second regions of the host carrier, and wherein the second set of physical resources comprises second physical resources, different from the first physical resources, in each of the first and second regions of the host carrier.

12. The device according to claim 8, wherein the first set of physical resources comprise a first plurality of frequencies of a plurality of frequencies of the host carrier, and wherein the second set of physical resources comprise a second plurality of frequencies that are contiguous and that are located within the first plurality of frequencies of the host carrier.

13. A method performed by a device configured as a first mobile unit in a wireless communication system that includes a base station, the method comprising:

receiving a transmission from the base station via one of a first carrier or a virtual carrier of the base station, wherein the first carrier comprises a first set of physical resources of a host carrier, wherein the virtual carrier comprises a second set of physical resources of the host carrier that are logically separate from the first set of physical resources of the host carrier, wherein the first carrier provides a first communication channel for the first mobile unit, wherein the virtual carrier provides a second communication channel for a second mobile unit different from the first mobile unit, wherein the transmission via the first carrier includes first allocation information about a location, outside of the virtual carrier and within the first carrier, of information that is common to the first carrier and the virtual carrier regarding communications with the base station via each of the first carrier and the virtual carrier, and wherein the transmission via the virtual carrier includes second allocation information about the location outside of the virtual carrier and within the first carrier of the information that is common to the first carrier and the virtual carrier;

accessing the common information within the first carrier; and communicating with the base station via one of the first or virtual carriers in accordance with the common information, wherein the virtual carrier comprises a virtual carrier control portion and a virtual carrier data portion, wherein the first allocation information, that is transmitted via the first transmission via the first carrier and that is about the location of the information that is common to the first carrier and the virtual carrier within the first carrier, is located in a predetermined control region of a subframe of the host carrier, and wherein the second allocation information, that is transmitted via the second transmission via the virtual carrier and that is also about the location of the information that is common to the first carrier and the virtual carrier within the first carrier, is located in a dedicated sub-portion of the virtual carrier control portion.

14. A method performed by a device configured as a base station in a wireless communication system that includes a first mobile unit and a second mobile unit, the method comprising:

performing:

a first transmission to the first mobile unit via a first carrier, and a second transmission to the second mobile unit via a virtual carrier, wherein the first carrier comprises a first set of physical resources of a host carrier, wherein the virtual carrier comprises a second set of physical resources that is logically separate from the first set of physical resources of the host carrier, wherein the first carrier provides a first communication channel for the first mobile unit, wherein the virtual carrier provides a second communication channel for a second mobile unit different from the first mobile unit, wherein the first transmission via the first carrier includes first allocation information about a location, outside of the virtual carrier and within the first carrier, of information that is common to the first carrier and the virtual carrier regarding communications with the base station via each of the first carrier and the virtual carrier, and wherein the second transmission via the virtual carrier includes second allocation information about the location outside of the virtual carrier and within the first carrier of the information that is common to the first carrier and the virtual carrier;

after the first and second mobile units access the common information within the first carrier, communicating with the first and second mobile units via respective ones of the first or virtual carriers in accordance with the common information, wherein the virtual carrier comprises a virtual carrier control portion and a virtual carrier data portion, wherein the first allocation information, that is transmitted via the first transmission via the first carrier and that is about the location of the information that is common to the first carrier and the virtual carrier within the first carrier, is located in a predetermined control region of a subframe of the host carrier, and wherein the second allocation information, that is transmitted via the second transmission via the virtual carrier and that is also about the location of the information that is common to the first carrier and the virtual carrier within the first carrier, is located in a dedicated sub-portion of the virtual carrier control portion.

* * * * *